United States Patent [19]

Olive

[11] 4,354,240
[45] Oct. 12, 1982

[54] FLIGHT PATH TRANSITION CONTROL APPARATUS WITH PREDICTIVE ROLL COMMAND

[75] Inventor: Edmond E. Olive, Phoenix, Ariz.

[73] Assignee: Sperry Corporation, New York, N.Y.

[21] Appl. No.: 133,213

[22] Filed: Mar. 24, 1980

[51] Int. Cl.³ .......................... G05D 1/08; B64C 13/16
[52] U.S. Cl. .................................... 364/434; 244/184;
364/447
[58] Field of Search ............... 364/434, 435, 441, 443;
244/175, 179, 181, 184, 189

[56] References Cited

U.S. PATENT DOCUMENTS

| | | | |
|---|---|---|---|
| 3,739,382 | 6/1973 | Younkin | 244/184 X |
| 3,807,666 | 4/1974 | Devlin | 244/179 X |
| 3,814,911 | 6/1974 | Lehfeldt | 244/189 X |
| 3,837,603 | 9/1974 | Schultz et al. | 244/184 |
| 3,989,209 | 11/1976 | Feintuch et al. | 244/184 |

Primary Examiner—Felix D. Gruber
Attorney, Agent, or Firm—Howard P. Terry; Albert B. Cooper

[57] ABSTRACT

The flight path transition control apparatus provides a roll attitude command to control the aircraft to execute an exponential transition path to a predetermined course in accordance with the exponential control law $Y + K\dot{Y}$ where $Y$ is the lateral displacement of the aircraft from the predetermined course, $\dot{Y}$ is the rate of change of the lateral displacement and $K$ is a time constant of the system. A predictive roll command $\phi_p$ is generated in accordance with $$\frac{V_g \sin TAE_0}{gK \cos TAE} e^{-t/K}$$

where
$V_g$ is the aircraft ground speed,
TAE is the track angle error of the aircraft with respect to the predetermined course,
$TAE_0$ is the track angle error of the aircraft with respect to the predetermined course at capture maneuver initiation,
g is the gravitational constant, and
t is the elapsed time following capture initiation.

The predictive roll command $\phi_p$ is combined with the exponential control law to provide the aircraft roll attitude command $\phi_c = \phi_p + Y + K\dot{Y}$ to control the aircraft to execute the exponential transition path in capturing the predetermined course.

17 Claims, 3 Drawing Figures

FLIGHT PATH TRANSITION CONTROL APPARATUS WITH PREDICTIVE ROLL COMMAND

BACKGROUND OF THE INVENTION

1. Field of the Invention

The invention relates to aircraft flight path control apparatus particularly with respect to flight path transition control.

2. Description of the Prior Art

One type of prior art flight path transition control apparatus utilizes the control law $Y+K\dot{Y}=0$. This is the control law conventionally utilized to control an aircraft along a wings-level straight line path where Y is the lateral displacement of the aircraft from the path, $\dot{Y}$ is the rate of change of Y and K is a time constant of the system. When the aircraft deviates from the straight line course to which it is being controlled, the Y and $K\dot{Y}$ terms become non zero and the difference therebetween generates a roll command $\phi_c$ to return the aircraft to the straight line path. When, in such prior art systems, it is desired to execute a transition from a first straight line course to a second straight line course, the lateral displacement Y and the displacement rate $\dot{Y}$ with respect to the first course is switched to the displacement and displacement rate with respect to the second course. An error signal proportional to the difference between Y and $K\dot{Y}$ generates a roll command $\phi_c$ to roll the aircraft into a turn in order to capture the second straight line course.

In such prior art systems it is often desirable to execute an exponential transition path from the first course to the second course. It is appreciated that the above mentioned control law $Y+K\dot{Y}=0$ is the differential equation defining the desired exponential path. When the aircraft is on the desired exponential transition path the difference between the lateral displacement Y of the aircraft from the new course and the displacement rate $K\dot{Y}$ will be 0. Since the control law $Y+K\dot{Y}=0$ is utilized to command the aircraft roll attitude to turn the aircraft toward the new path, the expression $Y+K\dot{Y}$ is not equal to zero during the transition but to the non-zero roll attitude command $\phi_c$ required to maintain the aircraft in a banked attitude so as to continue turning toward the new path. Since $Y+K\dot{Y}=0$ defines the desired exponential transition path, but in fact, $Y+K\dot{Y}=\phi_c$, the aircraft does not follow the desired exponential path but instead flies a standoff path with respect to the desired exponential curve with a resultant undesired overshoot of the new straight line course. In such prior art systems it was necessary to hold an error signal between Y and $K\dot{Y}$ in order to maintain the aircraft in a roll attitude resulting in the offset from the desired exponential path with the concomitant overshoot of the new course. Utilizing the control law $\phi_c = Y+K\dot{Y}$ to control the roll attitude of the aircraft so as to turn toward the new path guarantees an offset from the desired exponential path and an overshoot of the new path. It is appreciated that the roll command signal $\phi_c$ may be applied to the roll channel of either an automatic flight control system or of a flight director system to provide either automatic or directed human pilot flight control in executing the transition.

An alternative prior art transition control apparatus may be found in U.S. Pat. No. 3,994,456, issued Nov. 30, 1976 to William C. Post and Edmond E. Olive entitled "Steered Lateral Course Transition Control Apparatus for Aircraft Area Navigation Systems" and assigned to the assignee of the present invention. In this area navigation (RNAV) system the aircraft is controlled to follow a circular transition path from a first straight line course to a second straight line course. The steered turn control apparatus of said U.S. Pat. No. 3,994,456 suffers from an undesirable roll removal transient condition when approaching the new path. At a predetermined distance from the new path the bank angle command that determines the circular transition path is reduced to zero in order to roll the aircraft out onto the new path. The removal of the bank angle command, however, causes the aircraft to deviate from the desired circular path so that the actual path is not tangent to the new course. This condition results in an undesirable overshoot of the new course.

It is appreciated that with respect to the prior art exponential path capture and the RNAV path capture discussed above, lag in establishing the bank angle so as to execute the transition path again results in a deviation from the desired transition path.

SUMMARY OF THE INVENTION

The foregoing disadvantages of the prior art are obviated by the present invention of apparatus for controlling an aircraft to execute an exponential transition curve to a predetermined course. The present apparatus comprises means for generating a control law signal representative of the exponential transition curve; means for generating a predictive roll attitude signal representative of aircraft roll attitude for maintaining the aircraft on the exponential transition curve and means for combining the control law signal and the predictive roll attitude signal to provide a roll attitude command signal for controlling the aircraft to execute the exponential transition curve.

In the preferred embodiment of the invention the control law signal generating means comprises means for generating the control law signal in accordance with the exponential transition curve $Y+K\dot{Y}=0$ where Y is the lateral displacement of the aircraft from the predetermined course, $\dot{Y}$ is the rate of change of the displacement and K is a time constant of the system. In the preferred embodiment the predictive roll attitude signal generating means provides the predictive roll attitude signal $\phi_p$ as follows:

$$\frac{V_g \sin TAE_0}{gK \cos TAE} e^{-t/K}$$

where $V_g$ is the airspeed of the aircraft, $TAE_0$ is the track angle error of the aircraft at the capture maneuver initiation point, TAE is the instantaneous track angle error of the aircraft, g is the gravitational constant and t is elapsed time following capture maneuver initiation.

In the preferred embodiment of the invention, the roll attitude command signal provided by the means for combining the control law signal and the predictive roll attitude signal is denoted as $\phi_c$ as follows:

$$\phi_c = \phi_p + Y + K\dot{Y}$$

By utilizing the present invention, the aircraft is maintained on the desired exponential transition curve without offset therefrom or overshoot of the new course. The predictive roll attitude signal $\phi_p$ and consequently the roll attitude command signal $\phi_c$ decreases toward zero as the new course is approached assuring a transient free removal of the roll attitude command as the aircraft rolls back to wings level flight on the new course.

DESCRIPTION OF THE PREFERRED EMBODIMENT

Figure 1:
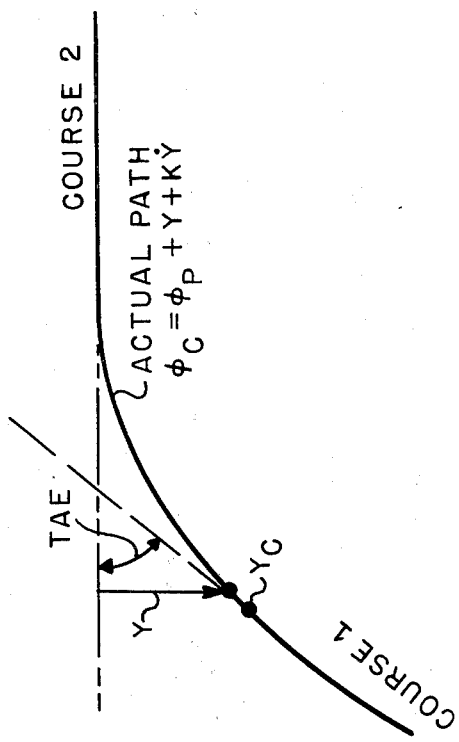
FIG. 1 is a graph illustrating the desired exponential path and the actual path followed utilizing prior art transition control apparatus.

Referring to FIG. 1, the geometry of the situation is depicted where, with the aircraft flying along a present course 1, it is desired to execute a transition to and capture a new course 2. A desired exponential transition path is illustrated defined by the differential equation $Y+K\dot{Y}=0$ where Y is the lateral distance from the exponential curve to the new course 2, $\dot{Y}$ is the rate of change of Y and K is a time constant of the system. When the aircraft is on the desired exponential path, its lateral displacement Y from the new course will be equal and opposite to K times the rate of change of the aircraft lateral displacement ($K\dot{Y}$), thereby satisfying the exponential path equation. Since, however, as discussed above, $Y+K\dot{Y}$ has been utilized in the prior art as the roll channel control law to execute the transition from course 1 to course 2, offset and overshoot occurs as depicted by the illustrated actual path $\phi_c=Y+K\dot{Y}$.

A point $Y_c$ is illustrated defining the lateral distance of the aircraft from the new course 2 at the initiation of the capture maneuver. $Y_c$ is the point at which the aircraft flying along course 1 first intercepts the desired exponential path. Also illustrated is the track angle error (TAE) of the aircraft flying along course 1 with respect to course 2. The track angle error is the difference between the bearing of course 2 and the bearing of the flight path of the aircraft. It is appreciated that as the aircraft executes the transition path, the track angle error decreases as the bearing of the aircraft approaches the bearing of the new course.

Figure 2:
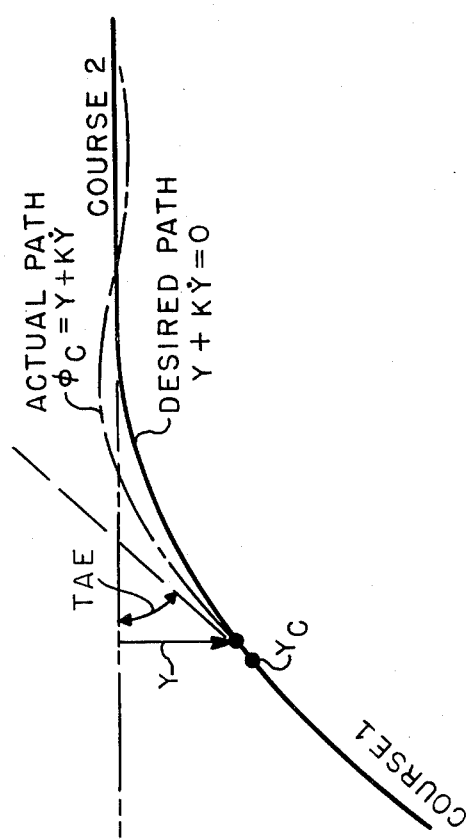
FIG. 2 is a graph illustrating the desired path actually followed utilizing the present invention.

Referring to FIG. 2, a graph similar to that of FIG. 1 is illustrated except that, in accordance with the present invention, the desired transition path $Y+K\dot{Y}=0$ is actually flown by the aircraft thereby eliminating the undesirable offset and overshoot of the actual path illustrated in FIG. 1 executed by aircraft controlled by prior art apparatus. The desired result of the present invention is achieved by adding a predictive roll attitude term $\phi_p$ to the exponential path control law $Y+K\dot{Y}$ to provide a roll attitude command $\phi_c$ as follows:

$$\phi_c=\phi_p+Y+K\dot{Y}$$

If the predictive command $\phi_p$ is equal to $\phi_c$, $Y+K\dot{Y}$ will be equal to zero throughout the capture maneuver and the aircraft will execute the course transition along the desired path.

With continued reference to FIGS. 1 and 2, the specific predictive roll attitude signal utilized with the specific exponential transition path described will now be derived.

The differential equation of the desired exponential transition path is $$Y+K\dot{Y}=0 \quad (1)$$

where Y is the lateral distance of the aircraft from the new path, $\dot{Y}$ is the rate of change of Y and K is a time constant of the system.

The time response or solution of the differential equation (1) is $$Y=Y_c e^{-t/K} \quad (2)$$

where $Y_c$ is the initial lateral distance of the aircraft from the new path at capture initiation and t is the time elapsed following capture initiation.

But at the capture initiation point $$Y_c=KV_g \sin TAE_0 \quad (3)$$

where $TAE_0$ is the angular difference between the aircraft track angle and the bearing of the new path at the capture initiation point and $V_g$ is the aircraft ground speed. It is appreciated that $V_g \sin TAE_0$ is the rate of change of the aircraft with respect to the new path at the capture initiation point. Multiplying by the time constant K yields the lateral distance $Y_c$ of the aircraft from the new path at the capture initiation point.

Differentiating Equation (2) to obtain the aircraft rate of displacement term yields:

$$\dot{Y} = \frac{-Y_c}{K} e^{-t/K} \quad (4)$$

It is appreciated that the rate of change of aircraft displacement with respect to the new path is also equal to $$\dot{Y}=V_g \sin TAE \quad (5)$$

where TAE is the angular difference between the track angle of the aircraft and the bearing of the new path. Setting Equation (4) equal to Equation (5) and solving for sin TAE provides $$\sin TAE = \frac{-Y_c}{KV_g} e^{-t/K} \quad (6)$$

Substituting $\omega t$ for TAE and differentiating yields $$\omega \cos \omega t = \frac{Y_c}{K^2 V_g} e^{-t/K} \quad (7)$$

Substituting Equation (3) in Equation (7) yields $$\omega \cos \omega t = \frac{\sin TAE_0}{K} e^{-t/K} \quad (8)$$

But $\omega$ is equal to the aircraft yaw rate, $\dot{\psi}$, for a coordinated turn, and aircraft yaw rate is $$\dot{\psi} = \frac{g}{V_g} \tan \phi \quad (9)$$

Substituting Equation (9) into Equation (7) and solving for $\phi$ provides the predictive roll attitude command $$\frac{V_g \sin TAE_0}{gK \cos TAE} e^{-t/K}$$

Equation (10) defines the specific roll attitude command which when added to Equation (1) satisfies the desired exponential capture maneuver.

It is appreciated from the foregoing that the differential Equation (1) and the solution thereof, Equation (2), represent a family of exponential curves parametrized in accordance with the time constant K and the initial point $Y_c$.

Figure 3:
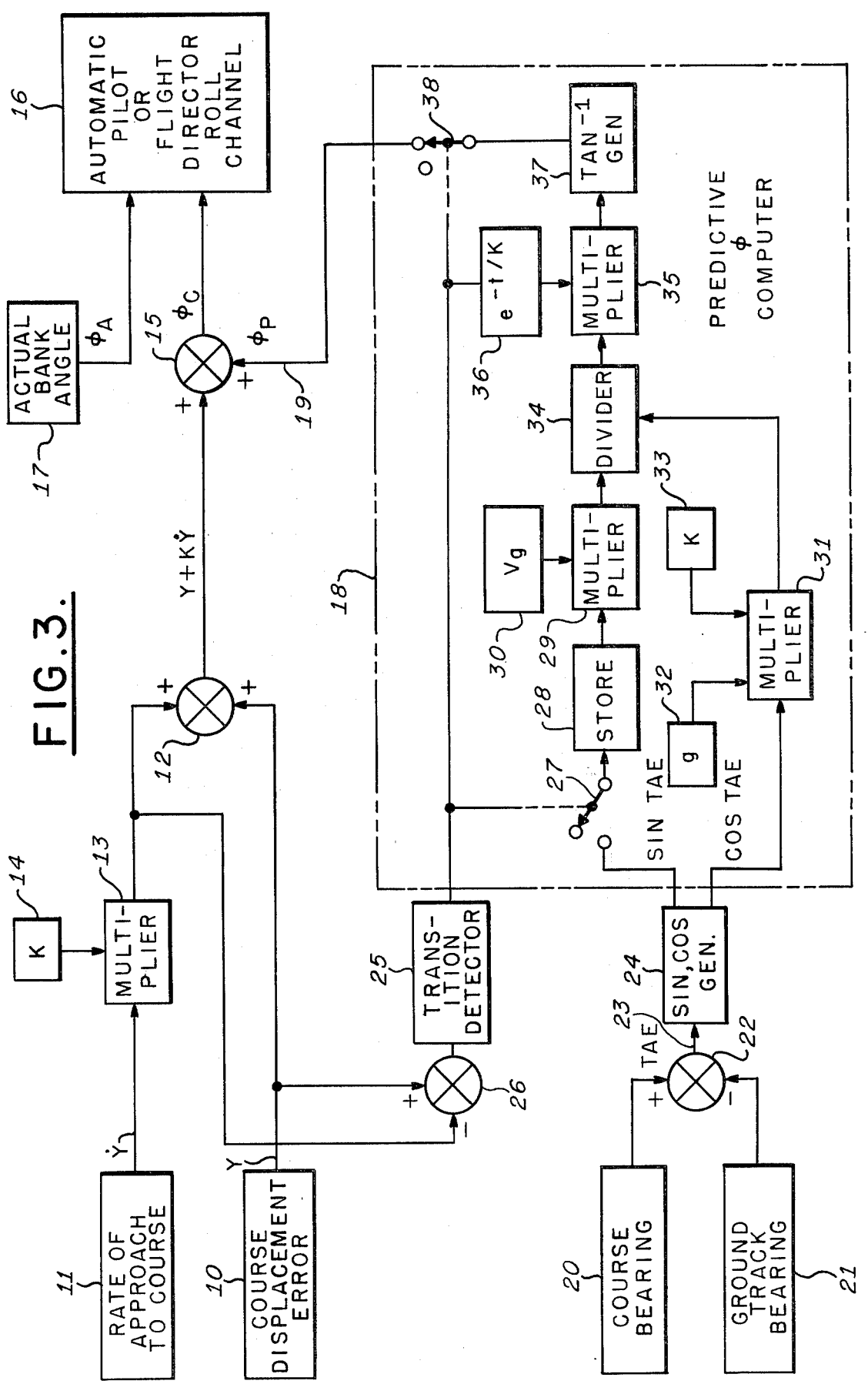
FIG. 3 is a schematic block diagram of the transition control apparatus of the present invention.

Referring to FIG. 3, a schematic block diagram of apparatus for controlling an aircraft to execute an exponential transition curve of the type depicted in FIG. 2 is illustrated. The apparatus of FIG. 3 generates a roll attitude command signal $\phi_c$ in accordance with $$\phi_c = \phi_p + Y + K\dot{Y}$$

where $\phi_p$ is the predictive roll attitude signal defined by Equation (10) above. A signal Y is provided by a course displacement error block 10 in accordance with the lateral displacement of the aircraft from the new course and a signal $\dot{Y}$ is provided by a rate of approach to course block 11 in accordance with the rate of change of the aircraft lateral displacement with respect to the new course. The $\dot{Y}$ signal from the block 10 is applied as an input to a summing circuit 12 and the Y signal from the block 11 is applied as a second input to the summing circuit 12 through a multiplier 13. The time constant K is provided by a block 14 as an input to the multiplier 13 for multiplication with the Y signal. The output from the summing circuit 12 therefore is a signal representative of the exponential transition curve $Y + K\dot{Y}$.

The output from the summing circuit 12 is applied as an input to a summing circuit 15, the output thereof providing the roll attitude command signal $\phi_c$. The $\phi_c$ output of the summing circuit 15 is applied to the roll channel 16 of an automatic flight control system or flight director system to provide automatic or directed human pilot control of the aircraft. The roll channel 16 also receives an actual bank angle signal $\phi_A$ from a block 17. In the conventional operation of the roll channel 16 the aircraft is oriented about the roll axis thereof until the actual bank angle signal $\phi_A$ is equal to the commanded roll attitude signal $\phi_c$. The blocks 10, 11 and 17 providing the signals Y, $\dot{Y}$ and $\phi_A$ are conventional components well known in the flight control arts. The automatic flight control system or flight director block 16 is of a conventional type also well known in the art. The block 10 may be implemented by any one of a large number of well known beam or course displacement sensors and the block 11 may similarly be implemented by any one of numerous rate detectors or rate takers utilized in the art. The block 17 may be implemented by any one of the large number of roll attitude sensors utilized in the art and may, for example, be implemented by the roll portion of a conventional vertical gyroscope.

It is appreciated that the aircraft is controlled to follow a desired course by applying the Y and $\dot{Y}$ signals with respect to that course. When it is desired to transition to or capture a new course, the displacement signal Y and displacement rate signal $\dot{Y}$ with respect to the present course are switched by conventional means not shown to provide these parameters with respect to the new course. It is appreciated, therefore, that the components 10-17 provide straight line path control of the aircraft as well as participating in the exponential transition path control of the present invention. Under straight line path control the parameters Y and $\dot{Y}$ are provided with respect to the straight line flight path to which it is desired to control the aircraft. When it is desired to execute a transition to a new straight line flight path the displacement Y and displacement rate $\dot{Y}$ are provided at the capture or transition initiation point with respect to the new path.

In accordance with the present invention a predictive roll attitude signal computer 18 is provided to generate the predictive roll attitude signal $\phi_p$ on a lead 19. In the preferred embodiment of the invention the predictive roll attitude signal computer 18 is implemented to provide the $\phi_p$ signal in accordance with Equation (10) above. The $\phi_p$ signal on the lead 19 is applied as an input to the summing circuit 15 wherein it is combined with the output from the summing circuit 12 to provide the roll attitude command signal $\phi_c$.

Conventional course bearing apparatus 20 provides a signal representative of the bearing of the new course to which it is desired to execute the transition. Conventional ground track bearing apparatus 21 provides a signal in accordance with the bearing of the aircraft actual track angle. The signals from the course bearing block 20 and the ground track bearing block 21 are applied to a summing circuit 22 wherein the difference therebetween is provided on a lead 23. The difference signal on the lead 23, which represents the difference between the actual aircraft track angle and the bearing of the new course provides the aircraft instantaneous track angle error signal TAE. The TAE signal on the lead 23 is applied to a sin, cos generator 24 wherein the sin of TAE and the cos of TAE is generated utilizing conventional circuitry to provide sin TAE and cos TAE signals as inputs to the predictive roll attitude signal computer 18 as indicated by the legends.

A transition detector 25 provides a signal representative of the initiation of the capture maneuver when the aircraft reaches the point $Y_c$ (FIG. 2). Capture of the new path is initiated when the aircraft first attains a point on the desired exponential transition curve, at which point Y is equal to $K\dot{Y}$. Accordingly, the signal Y from the course displacement error block 10 and the signal $K\dot{Y}$ from the multiplier 13 are applied as inputs to a summing circuit 26 which in turn provides the difference therebetween to the transition detector 25. When Y is equal to $K\dot{Y}$ the difference therebetween goes to zero causing the transition detector 25 to provide a capture maneuver initiation signal to the predictive roll attitude signal computer 18.

The sin TAE signal from the sin, cos generator 24 is applied through a switch 27 to a memory 28 for storing the instantaneous extant value of sin TAE at the capture initiation point. Prior to the aircraft attaining the capture initiation point, the switch 27 is maintained by the transition detector 25 in the closed position. When the capture initiation point $Y_c$ is attained, the transition detector 25 opens the switch 27 causing the desired instantaneous value of sin TAE to be stored in the memory 28. This instantaneous value of sin TAE has been denoted hereinabove as sin $TAE_0$.

The output of the memory 28 is applied as an input to a multiplier 29 which receives a second input from a $V_g$ block 30. The $V_g$ block 30 provides, in any convenient and conventional manner, a signal representative of the airspeed of the aircraft. The output of the multiplier 29, therefore, is the $V_g \sin TAE_0$ term of the Equation (10) above.

The cos TAE signal from the sin, cos generator 24 is applied as an input to a multiplier 31. The multiplier 31 also receives inputs from a g block 32 and a K block 33. The g block 32 provides a signal representative of the gravitational constant g and the K block 33 provides a signal representative of the time constant K of the system discussed above with respect to the block 14. The multiplier 31, therefore, provides as its output a signal representative of the term gK cos TAE of Equation (10) above.

The outputs of the multipliers 29 and 31 are applied as inputs to a divider 34 which provides a quotient in accordance with dividing the output of the multiplier 29 by the output of the multiplier 31. The output of the divider 34, therefore, provides a signal representative of the term $$\frac{V_g \sin TAE_O}{gK \cos TAE}$$

of the Equation (10) above.

The output of the divider 34 is applied as an input to a multiplier 35 which receives a second input from a block 36 wherein the term $e^{-t/K}$ is generated where t is the elapsed time following capture initiation. Accordingly, the block 36 receives an input from the transition detector 25 so as to start an elapsed time generator (not shown) within the block 36 running for providing the elapsed time measure. Accordingly, the output of the multiplier 35 provides a signal representative of the term $$\frac{V_g \sin TAE_0}{gK \cos TAE} e^{-t/K}$$

of the Equation (10) above.

The output of the multiplier 35 is applied as an input to an arc tangent generator 37 which, in a conventional manner, provides the arc tangent function of the output of the multiplier 35. The output of the arc tangent generator 37, therefore, is the $\phi_p$ signal designated by Equation (10) above. The $\phi_p$ output of the arc tangent generator 37 is applied via a switch 38 to the line 19 to provide the $\phi_p$ output of the predictive roll attitude signal computer 18 to the summing circuit 15. The switch 38 is actuated by the transition detector 25 to be in the open position prior to the initiation of the capture maneuver and to be in the closed position upon capture maneuver initiation. It is appreciated, therefore, that prior to initiation of the capture maneuver, the roll attitude command signal $\phi_c$ provided from the summing circuit 15 is the straight line control law $Y+K\dot{Y}$ from the summing circuit 12. Also prior to capture initiation, with the switch 38 open and the switch 27 closed, the predictive roll attitude signal computer 18 continuously computes the value of the predictive roll attitude signal $\phi_p$. Upon initiation of the capture maneuver when the switch 38 is closed and the switch 27 opened, the instantaneous value of sin TAE is stored in the memory 28 and the predictive roll attitude signal $\phi_p$ is added to the control law $Y+K\dot{Y}$ to provide the transition path control law $$\phi_c = \phi_p + Y + K\dot{Y}$$

in accordance with the present invention.

When the aircraft attains the capture initiation point $Y_c$, the predictive roll attitude signal $\phi_p$ introduced into the control law at the summing circuit 15 rolls the aircraft into a turn onto the exponential transition curve as illustrated in FIG. 2. As the aircraft proceeds along the exponential transition curve, the changing value of cos TAE and the changing value of $e^{-t/K}$ from the block 36 continuously alter the value of the predictive roll attitude signal $\phi_p$ to provide the roll attitude required to maintain the aircraft on the desired exponential transition curve. As the approach to the new course continues, the cos TAE and $e^{-t/K}$ terms command a smooth rollout of the aircraft simultaneously with the asymptote of the exponential curve with respect to the new course going to zero. It is appreciated, therefore, that in the present invention the bank angle required to maintain the aircraft on the asymptotic approach path to the new course is continuously computed or predicted so that as the new path is approached the bank angle is automatically reduced so as to maintain the aircraft on the $Y+K\dot{Y}=0$ path.

As discussed above, the generation of the terms Y, $\dot{Y}$ and TAE are conventional and well known in the art. Specifically, apparatus for providing these terms may be found in the following United States patents which are all assigned to the present assignee and are incorporated herein by reference: U.S. Pat. No. 2,613,352 issued Oct. 7, 1952 to S. Kellogg, II, entitled "Radio Navigation System;" U.S. Pat. No. 2,776,428 issued Jan. 1, 1957 to N. A. Hassler et al entitled "Signal Phase-Correcting System;" U.S. Pat. No. 2,881,992 issued Apr. 14, 1959 to H. Hecht et al entitled "Radio Controlled Craft Guiding System;" U.S. Pat. No. 3,058,698 issued Oct. 16, 1962 to F. S. Campbell entitled "Radio Beam Coupler;" U.S. Pat. No. 3,994,456 issued Nov. 30, 1976 to W. C. Post et al entitled "Steered Lateral Course Transition Control Apparatus for Aircraft Area Navigation Systems."

For example, the Y and $\dot{Y}$ terms may be provided by the U.S. Pat. No. 2,613,352 apparatus with Y appearing on the input to amplifier 70 and $\dot{Y}$ on the lead 76. In U.S. Pat. No. 2,776,428 the Y term may be obtained on lead 3, the $\dot{Y}$ term on the output of the amplifier 10 and the TAE term on the lead 11a. In the U.S. Pat. No. 3,881,992, $Y+K\dot{Y}$ appears on switch 62 and TAE appears across the potentiometer 52. The transition detector 25 of the present application may be of the type exemplified by the relay 32 in U.S. Pat. No. 3,058,698. The $V_g$ signal in the block 30 of the present application may be derived in a conventional manner from an air data computer compensated for wind or as a direct output from an inertial navigation system or doppler system. Alternatively, the signals may be generated by routine modification of the apparatus of U.S. Pat. No. 3,994,456. TAE is directly available at the output of the function block 23 of FIG. 3 and the perpendicular distance Y from the point A, or the point A' or, within range limits, any point along the inbound course to the new or outbound course is proportional to $Y = d \sin TAE$ where d is available at the output of function block 34, the parameter being readily provided utilizing conventional analog or digital techniques. The quantity $\dot{Y}$ is similarly readily generated by means of conventional derivative rate taking computations. In U.S. Pat. No. 3,994,456 the threshold detector may be implemented by a zero detector ($0 \pm a$ bias) responsive to $Y-\dot{Y}$ or $Y-TAE$ or both. The quantity $V_g$ is available at the output of function block 24.

Although the switches 27 and 38 are depicted in FIG. 3 as mechanical devices, it is appreciated that preferably electronic switches electrically actuated by the transition detector 25 may be utilized.

It is appreciated that the apparatus of FIG. 3 may be implemented by discrete analog or digital circuitry or by programmed general purpose digital computation apparatus. It will further be appreciated that mathematical terms equivalent to those delineated above may be utilized in implementing embodiments of the present invention. For example, it is observed from Equation (3) above that $V_g \sin TAE_0 = Y_c/K$. This expression may be substituted into Equation (10) to yield $$\phi_p = \tan^{-1}\left[\frac{Y_c}{gK^2 \cos TAE} e^{-t/K}\right]$$

and alterations concomitant with this expression would be effected in the FIG. 3 apparatus. For example, $Y_c$ may be obtained by storing the instantaneous value of Y from the course displacement error block 10 at the capture initiation point detected by the transition detector 25.

Although the preferred embodiment of the invention was described in terms of the desired exponential transition curve $Y + K\dot{Y} = 0$ and in terms of the predictive roll attitude signal $\phi_p$ delineated above in Equation (10), the invention may be implemented in alternative embodiments utilizing different formulations of the exponential control law with concomitant predictive roll attitude terms.

Additionally, it is appreciated that by appropriately varying the time constant K in the exponential control law $Y + K\dot{Y}$, a family of exponential curves is defined, all passing through the point $Y_c$ and all asymptotic to the new course but each with a different time constant. Thus, by utilizing the present invention it is possible to control the asymptotic path time constant K to generate a path curvature consistent with maximum allowable bank limits. The time constant K may be selected whereby the predictive roll attitude command is less than or equal to the maximum allowable roll limit. In this manner large bank angle transitions may be achieved without overshoot. The cos TAE and $e^{-t/K}$ terms of Equation (10) provide roll-out onto the new course without overshoot.

As explained above, when $\phi_c = \phi_p$, $Y + K\dot{Y}$ will be equal to zero throughout the capture maneuver and the aircraft will remain on the desired exponential transition curve. If the aircraft departs from the desired curve, the difference between Y and $K\dot{Y}$ will depart from zero and an error signal will be developed in accordance with the difference therebetween to control the aircraft back to the exponential transition curve. If the aircraft should become severely displaced from the exponential transition curve being followed by, for example, a severe wind gust, the predictive roll attitude term will endeavor to bring the aircraft back to the original transition curve, but, in so doing, another one of the family of exponential curves may be encountered, where the equality between Y and $K\dot{Y}$ is satisfied and thereafter the aircraft will control to the new exponential transition curve. Since from Equation (5) above $\dot{Y} = V_g \sin TAE$, the term $V_g \sin TAE$ is the rate of change of Y. Therefore, irrespective of the severity of the displacement, if TAE does not change, the aircraft is controlled back to the original exponential curve since there is only one unique Y that satisfies the $K\dot{Y}$ corresponding to the TAE.

It is appreciated from the foregoing that when approaching the new course the predictive term is being continuously computed. When the aircraft reaches the capture initiation point where $Y = K\dot{Y}$, the predictive roll term given above with respect to Equation (10) is precisely the correct roll angle to place the aircraft on the exponential transition curve encountered. As the aircraft continues along the exponential transition curve, the change in the predictive roll attitude term $\phi_p$ of Equation (10) varies in the precise manner required to maintain the aircraft on the exponential curve throughout the transition capture maneuver.

The present invention provides a steering command signal $\phi_c$ to cause the aircraft to execute a transition from one lateral path to another. This transition execution is utilized, for example, when changing from one RNAV path to another or from a localizer intercept path to the localizer path. The invention provides a course approach and capture control law particularly useful in approaching localizer beams where it is desired not to have any overshoot and the invention can be utilized in an approach to any new course such as a VOR radial.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for controlling an aircraft to execute a capture maneuver of a predetermined course along an exponential transition curve comprising
   means for generating a control law signal representative of said exponential transition curve,
   means for generating a predictive roll attitude signal representative of aircraft roll attitude for maintaining said aircraft on said exponential transition curve,
   means for combining said control law signal and said predictive roll attitude signal to provide a roll attitude command signal for controlling said aircraft to execute said exponential transition curve,
   transition detector means for providing a capture maneuver initiation signal in accordance with initiation of said capture maneuver, and
   means for switchably coupling said predictive roll attitude signal to said means for combining said control law signal and said predictive roll attitude signal in accordance with said capture maneuver initiation signal.

2. The apparatus of claim 1 in which said means for generating a control law signal comprises
   means for providing a displacement signal representative of the displacement of said aircraft from said predetermined course,
   means for providing a displacement rate signal representative of the rate of change of the displacement of said aircraft from said predetermined course, and
   means for combining said displacement signal and said displacement rate signal to provide said control law signal.

3. The apparatus of claim 1 in which said means for generating a control law signal comprises means for generating said control law signal in accordance with a control law equivalent to $Y+K\dot{Y}$, where Y is the displacement of said aircraft from said predetermined course, $\dot{Y}$ is the time rate of change of the displacement of said aircraft from said predetermined course and K is a time constant of said apparatus.

4. The apparatus of claim 3 in which said means for combining said control law signal and said predictive roll attitude signal comprises means for providing said roll attitude command signal in accordance with $\phi_c = \phi_p + Y + K\dot{Y}$, where $\phi_c$ is said roll attitude command signal and $\phi_p$ is said predictive roll attitude signal.

5. The apparatus of claim 1 in which said means for generating a predictive roll attitude signal comprises means for generating said predictive roll attitude signal in accordance with a function of the track angle error of said aircraft with respect to said predetermined course and of a function of the time elapsed following initiation of said capture maneuver.

6. The apparatus of claim 1 in which said means for generating a predictive roll attitude signal comprises means for generating said predictive roll attitude signal in accordance with a function of the track angle error of said aircraft with respect to said predetermined course and of an exponential function of the time elapsed following the initiation of said capture maneuver.

7. The apparatus of claim 6 in which said means for generating a predictive roll attitude signal comprises means for generating said predictive roll attitude signal further in accordance with a function of the ground speed of said aircraft.

8. The apparatus of claim 7 in which said means for generating a predictive roll attitude signal comprises means for generating said predictive roll attitude signal further in accordance with a function of the extant track angle error of said aircraft with respect to said predetermined course at the initiation of said capture maneuver.

9. The apparatus of claim 4 in which said means for generating a predictive roll attitude signal comprises means for generating said predictive roll attitude signal in accordance with $$\frac{V_g \sin TAE_0}{gK \cos TAE} e^{-t/K}$$

where $V_g$ is the ground speed of said aircraft, TAE is the track angle error of said aircraft with respect to said predetermined course, $TAE_0$ is the extant track angle error of said aircraft with respect to said predetermined course at the initiation of said capture maneuver, g is the gravitational constant and t is the time elapsed following the initiation of said capture maneuver.

10. The apparatus of claim 1 in which said transition detector means comprises means for providing said capture maneuver initiation signal in accordance with said control law signal going to null.

11. The apparatus of claim 4 in which said transition detector means comprises means for providing said capture maneuver initiation signal when $Y = K\dot{Y}$.

12. The apparatus of claim 10 in which said means for generating a predictive roll attitude signal comprises means responsive to said capture maneuver initiation signal for generating said predictive roll attitude signal in accordance with a function of the track angle error of said aircraft with respect to said predetermined course and of a function of the time elapsed following said capture maneuver initiation signal.

13. The apparatus of claim 10 in which said means for generating a predictive roll attitude signal comprises means responsive to said capture maneuver initiation signal for generating said predictive roll attitude signal in accordance with a function of the track angle error of said aircraft with respect to said predetermined course and of an exponential function of the time elapsed following the occurrence of said capture maneuver initiation signal.

14. The apparatus of claim 13 in which said means for generating a predictive roll attitude signal comprises means responsive to said capture maneuver initiation signal for generating said predictive roll attitude signal further in accordance with a function of the extant track angle error of said aircraft with respect to said predetermined course at the occurrence of said capture maneuver initiation signal.

15. The apparatus of claim 14 further including memory means for storing said function of said extant track angle error in response to said capture maneuver initiation signal.

16. The apparatus of claim 11 in which said means for generating a predictive roll attitude signal comprises means responsive to said capture maneuver initiation signal for generating said predictive roll attitude signal in accordance with $$\frac{V_g \sin TAE_0}{gK \cos TAE} e^{-t/K}$$

where $V_g$ is the ground speed of said aircraft, TAE is the track angle error of said aircraft with respect to said predetermined course, $TAE_0$ is the extant track angle error of said aircraft with respect to said predetermined course at the occurrence of said capture maneuver initiation signal, g is the gravitational constant and t is the time elapsed following the occurrence of said capture maneuver initiation signal.

17. The apparatus of claim 16 in which said means for generating a predictive roll attitude signal further comprises memory means for storing $\sin TAE_0$ in response to said capture maneuver initiation signal.

* * * * *